(12) United States Patent
Powick et al.

(10) Patent No.: US 12,738,183 B2
(45) Date of Patent: Sep. 15, 2026

(54) DISPLAY MOUNTING SYSTEM

(71) Applicant: UNILUMIN GROUP CO., LTD., Shenzhen (CN)

(72) Inventors: Michael Ian Powick, Waitara (NZ); Grant Arthur John Elliott, New Plymouth (NZ); Marcus Robert Patterson, Oteha (NZ)

(73) Assignee: UNILUMIN GROUP CO., LTD., Shenzhen (CN)

( * ) Notice: Subject to any disclaimer, the term of this patent is extended or adjusted under 35 U.S.C. 154(b) by 330 days.

(21) Appl. No.: 18/008,438

(22) PCT Filed: Jun. 4, 2021

(86) PCT No.: PCT/NZ2021/050088

§ 371 (c)(1),
(2) Date: Dec. 5, 2022

(87) PCT Pub. No.: WO2021/246878

PCT Pub. Date: Dec. 9, 2021

(65) Prior Publication Data

US 2023/0230512 A1 Jul. 20, 2023

(30) Foreign Application Priority Data

Jun. 5, 2020 (NZ) ........................................ 765181

(51) Int. Cl.
*G09F 9/302* (2006.01)
*F16M 11/04* (2006.01)
(Continued)

(52) U.S. Cl.
CPC ......... *G09F 9/3026* (2013.01); *F16M 11/043* (2013.01); *F16M 11/06* (2013.01); *G09F 7/20* (2013.01); *G09F 2007/1856* (2013.01)

(58) Field of Classification Search
CPC .. G09F 9/3026; G09F 7/20; G09F 2007/1856; G09F 7/18; F16M 11/043; F16M 11/06
(Continued)

(56) References Cited

U.S. PATENT DOCUMENTS 8,384,616 B2 2/2013 Elliott et al.
8,464,496 B2 * 6/2013 Cusson .................. F24S 25/12 126/621

(Continued)

FOREIGN PATENT DOCUMENTS

CN 204345213 U 5/2015
KR 101888561 B1 8/2018
WO 2021246878 A1 12/2021

OTHER PUBLICATIONS

Foreign Communication from a Related Counterpart Application, International Search Report and Written Opinion dated Aug. 20, 2021, International Application No. PCT/NZ2021/050088 filed on Jun. 4, 2021.

(Continued)

*Primary Examiner* — Alfred J Wujciak
(74) *Attorney, Agent, or Firm* — Conley Rose, P.C.

(57) ABSTRACT

A modular display support structure is described, the modular display support structure comprising: a substantially vertical structural member including at least one mounting flange, and a receiving recess, the recess extending parallel with, and for a substantial portion of, a longitudinal axis of the structural member; and a mounting member including an interface flange to mate with the receiving recess, and an attachment flange; wherein the attachment flange includes a plurality of attachment apertures for each of a plurality of display panels. A system and method are also described.

30 Claims, 20 Drawing Sheets

(51) Int. Cl.
*F16M 11/06* (2006.01)
*G09F 7/18* (2006.01)
*G09F 7/20* (2006.01)

(58) Field of Classification Search
USPC ............................ 248/295.11, 287.11, 298.1
See application file for complete search history.

(56) References Cited

U.S. PATENT DOCUMENTS

| | | | | |
|---|---|---|---|---|
| 8,596,599 | B1* | 12/2013 | Carson | F16M 11/2085 248/920 |
| 8,992,037 | B2 | 3/2015 | Rycyna, III | |
| 10,885,815 | B1* | 1/2021 | Svidler | F16M 11/045 |
| 2006/0266900 | A1 | 11/2006 | May et al. | |
| 2009/0225506 | A1 | 9/2009 | Lee et al. | |
| 2009/0289160 | A1* | 11/2009 | Kludt | G09F 9/33 248/226.11 |
| 2010/0102188 | A1* | 4/2010 | Liu | F16M 11/105 248/295.11 |
| 2011/0019348 | A1* | 1/2011 | Kludt | G09F 9/3026 361/679.01 |
| 2011/0303800 | A1* | 12/2011 | Sapper | F16M 11/10 248/295.11 |
| 2011/0315837 | A1 | 12/2011 | Mitsuhashi | |
| 2014/0319307 | A1 | 10/2014 | Schrock et al. | |
| 2016/0275828 | A1* | 9/2016 | White | G09F 17/00 |
| 2017/0221392 | A1* | 8/2017 | Taylor | G09F 9/3026 |
| 2020/0104090 | A1 | 4/2020 | Kim et al. | |
| 2020/0135067 | A1 | 4/2020 | Topousis et al. | |
| 2020/0169214 | A1* | 5/2020 | Koch | H02S 30/10 |
| 2020/0205305 | A1* | 6/2020 | Kim | F16M 11/24 |

OTHER PUBLICATIONS

Foreign Communication from a Related Counterpart Application, Extended European Search Report dated Feb. 9, 2024, European Application No. 21818533.8 filed on Jun. 4, 2021.

* cited by examiner

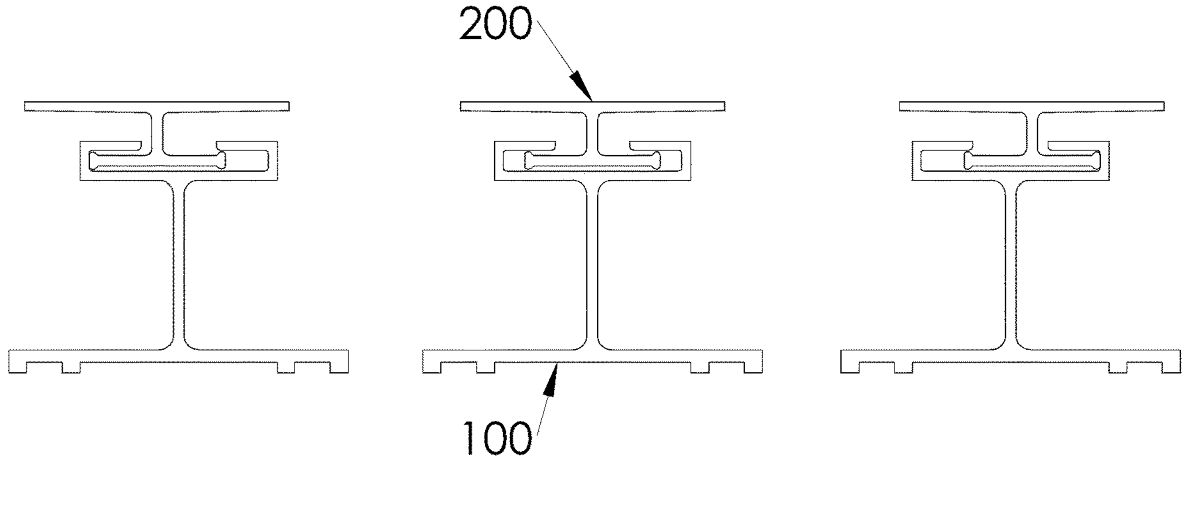
Figure 3b
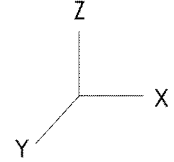

DISPLAY MOUNTING SYSTEM

CROSS-REFERENCE TO RELATED APPLICATIONS

The present application is a filing under 35 U.S.C. 371 as the National Stage of International Application No. PCT/NZ2021/050088, filed Jun. 4, 2021, entitled "DISPLAY MOUNTING SYSTEM," which claims priority to New Zealand Application No 765181 filed with the Intellectual Property Office of New Zealand on Jun. 5, 2020, both of which are incorporated herein by reference in their entirety for all purposes.

FIELD

The invention relates to a display mounting system.

BACKGROUND

There are various prior art methods of electronic billboards. For example U.S. Pat. No. 8,384,616 or U.S. Pat. No. 8,992,037.

SUMMARY

The invention relates to a mounting system for modular LED panels, primarily for electronic billboards. A structural extrusion is attached to the building or billboard frame, and the LED panels clamp/clip to a mounting extrusion which floats or slides on or in the structural extrusion. The free floating movement in the X axis is provided by the mounting extrusion.

According to one example embodiment there is provided a modular display support structure, comprising:

- a substantially vertical structural member including at least one mounting flange, and a receiving recess, the recess extending parallel with, and for a substantial portion of, a longitudinal axis of the structural member; and
- a mounting member including an interface flange to mate with the receiving recess, and an attachment flange; wherein the attachment flange includes a plurality of attachment apertures for each of a plurality of display panels.

Embodiments may be implemented according to any one of the originally filed dependent claims that depends from the above example embodiment.

According to another example embodiment there is provided a modular display system, comprising:

- a structural member configured to be mounted to a fixture;
- a plurality of display panels; and
- a mounting member configured to mount, support and/or align the plurality of display panels,
- wherein the alignment member is configured to be substantially retained by the structural member in at least one axis of movement, but to allow restricted translation in at least one translation axis and/or restricted rotation in at least one rotational axis.

Embodiments may be implemented according to any one of the originally filed dependent claims that depends from the above another example embodiment.

According to yet another example embodiment there is provided a method, comprising:

- mounting a structural member to a fixture;
- attaching one of a plurality of display panels to a mounting member,
- aligning the mounting member to one or more respective further mounting members in at least one axis to thereby align the plurality of display panels restraining, and
- restraining and/or supporting the mounting member using the structural member.

Embodiments may be implemented according to the originally filed dependent claim that depends from the above yet another example embodiment.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which:

FIG. 3*b* is an end view of three configurations of a structure and mounting member of an embodiment of the display mounting system interconnected;

FIG. 8 is an exploded view of an offset rail assembly;

DETAILED DESCRIPTION

A display mounting system may (depending on the requirements of the application) need to:

- Eliminate any structural (low tolerance) mechanical joints occurring at the same point where LED panels need align to each other. Typical box type frames have manufactured tolerance of +/−1 mm;
- Allow for differences in the thermal expansion between the mounting structure (building or billboard etc), frame and the LED panels themselves; and/or
- Compensate for the relatively non accurate installation accuracy of the frame onto the mounting structure to ensure that the LED panels are aligned in all 3 axis.

Alongside box frames solutions, using vertically mounted I-beams is an existing solution. With modern machining techniques, holes can be machined into the front face of the I-beam which facilitates accurate alignment in the X and Y axis between LED panels. The challenges with this design are that it requires the I-beams to be mounted to a high degree of accuracy in all 3 planes as there is no "give" in the frames and the I beams need to be mounted flush with the screen ensuring they are perpendicular to the wall otherwise the skew could cause mounting issues.

Adjustment in the Z plane can be achieved using packers 1214 and a string line, however the I-beams must be spaced apart perfectly (X axis) and be all at the same height (Y axis). While not impossible, this can be very difficult. The solution does not allow for differences in thermal expansion between the mounting surface (e.g. steel reinforced concrete) and the LED panels (typically plastic). This problem is further exacerbated when there are differences in sunlight exposure between the mounting surface and the LED panels, e.g. where the LED surface is exposed to the rising sun, but blocks sunlight from the concrete wall resulting in a large temperature differential.

Figure 1:
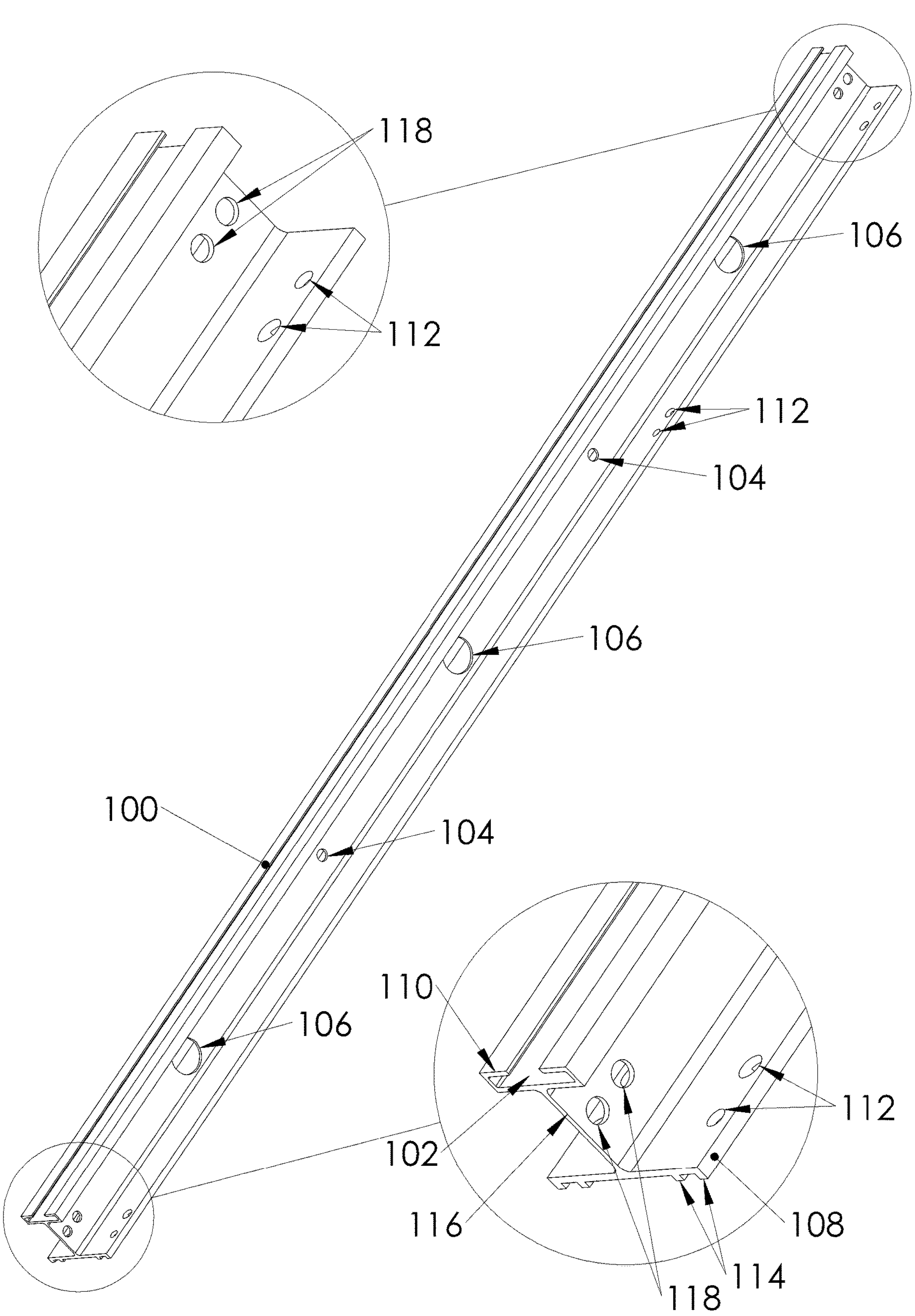
FIG. 1 is an isometric view of a structure member of an embodiment of the display mounting system.
Figure 2:
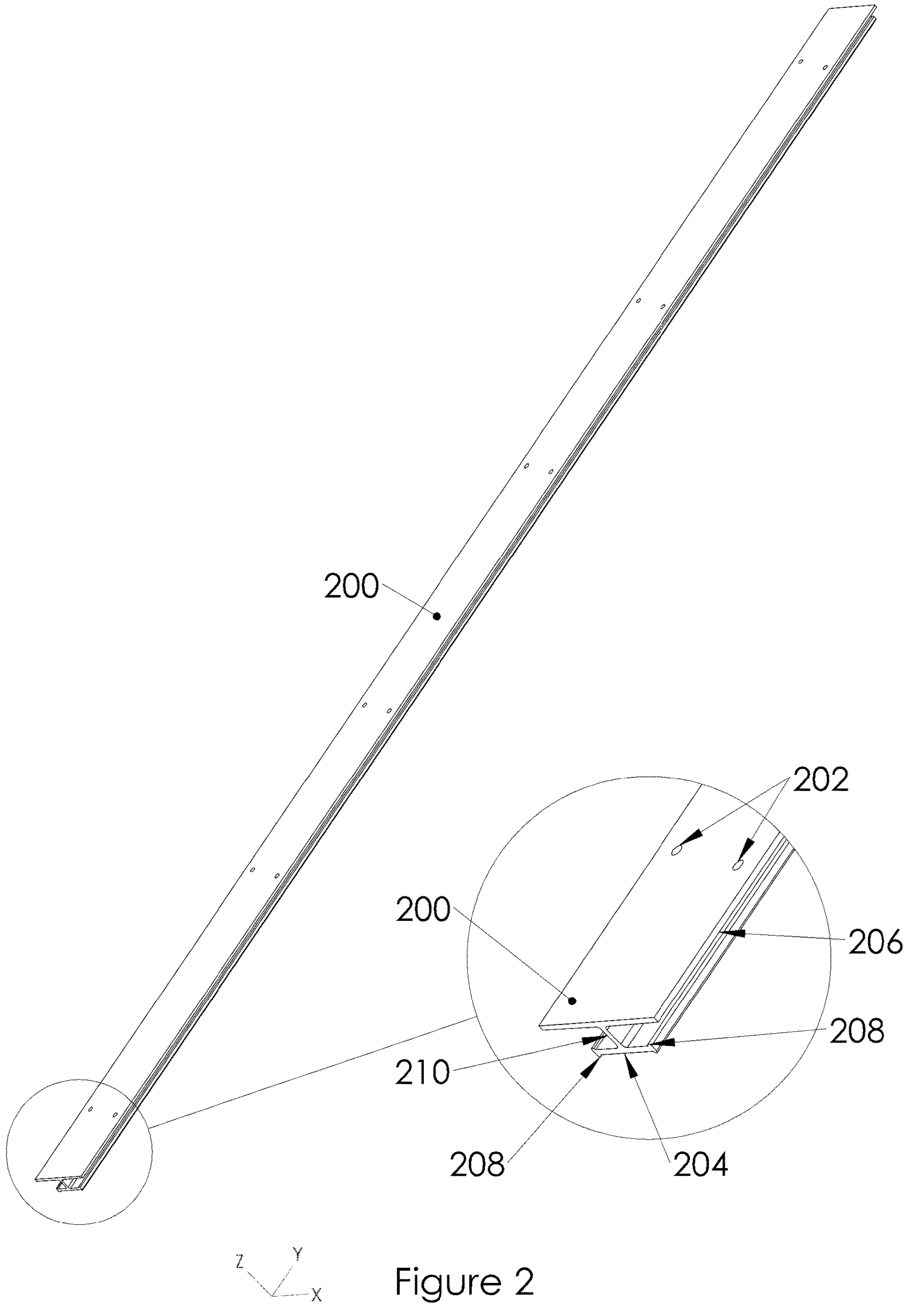
FIG. 2 is an isometric view of a mounting member of an embodiment of the display mounting system.

A framing system according to an example embodiment comprises a plurality of interlocking loosely coupled extrusion profile sets comprising a fixed component 100 shown in FIG. 1 and a loosely coupled component 200 shown in FIG. 2. This framing system is then attached to a primary structure such as a wall or steel free standing structure to hold the screen in place.

The base or fixed component 100 is a structural member and in one embodiment may be a rail. The structural member may be extruded from a metal, such as aluminium and may include a protective coating such as anodization.

Referring to FIG. 1, the structural member 100 is an asymmetric I beam with a wider fixture flange 108 at the base and a receiving flange 110 at the top. The receiving flange 110 includes a receiving recess 102. In this way the receiving recess extends 102 parallel with, and for a substantial portion of, a longitudinal axis of the structural member 100. The geometry of the I beam, including the thickness and depth of the vertical interconnecting web component 116 of the I section, are designed to provide sufficient strength in the Z axis against forces such as wind loading. This geometry will vary depending upon the design parameters for the structural member, taking into consideration factors such as; the acceptable Z axis deviation due to wind for an outdoor display, the span between fixing points to the primary structure and the level of acceptable deflection under maximum rated wind loads. The fixture flange 108 may have a number of ribs 114 along its length to provide additional strength and also minimise the contact area to the surface to which the member is fixed to, to allow for surfaces that are not smooth or have debris on them. The fixture flange also includes a series of holes 112 along its length that may be used to fasten the structural member 100 to a wall or a mounting structure.

Each structural member 100 may contain holes 104 in the web 116 for connection to horizontal spacers 900 or 906, described below. Each structural member 100 may include a series of larger holes 106 in the web 116 to allow for cabling to pass through each structural member 100 if required when the LED panels are installed. Each structural member 100 may include holes 118 in the web 116 at each end for the mounting of a top stop 600 or end stop 400.

For example, a structural member for a screen constructed with LED panels 902 500 mm wide, designed to accommodate a 3 m span between fixing points, with a rated wind loading of 200 km/hr and a maximum deflection of 15 mm, may be constructed from an extruded aluminium bar manufactured from 6061-T6 alloy with:

- a fixture flange 108 of width 95 mm and thickness of 3.5 mm
- four ribs 114 of width 5 mm and depth 3 mm
- a centre web 116 between the fixture flange 108 and receiving flange of width 3 mm and height of 47.5 mm
- a receiving flange 110 with wall thickness of 2.5 mm, a total width of 55 mm, with a slot width of 21 mm and an internal gap between the top section of the fixture flange and lower section of the interface flange of 6 mm
- 12 mm holes 104 to facilitate attachment to the horizontal spacers
- 50 mm holes 106 to allow cable pass through.
- 10 mm holes 118 for mounting end stop 400 and top stop 600

Referring to FIG. 2, the loosely coupled component 200 is a mounting member and in one embodiment may be a rail. The mounting member 200 may be extruded from a metal, such as aluminium or a plastic such as ABS. The mounting member 200 is also an asymmetric I beam. The mounting member 200 comprises an interface flange 204 for engaging with the structural member at its base, an attachment flange 206 that the LED panels secure to, and an interconnecting web 210. The interface flange 204 and attachment flange extend parallel with, and for a substantial portion of a longitudinal axis of the mounting member 200. There is a much shorter interconnecting vertical web 210 between the interface flange and the attachment flange as the mounting member needs less z axis rigidity due to this is being provided by the structural member 100 when engaged. Therefore the z-axis strength of the mounting member 200 needs to only be sufficient to ensure the interface flange 204 remains coupled to the receiving recess 102 of the structural member 100 under adverse conditions such as high wind loading or earthquakes.

Figure 14A:
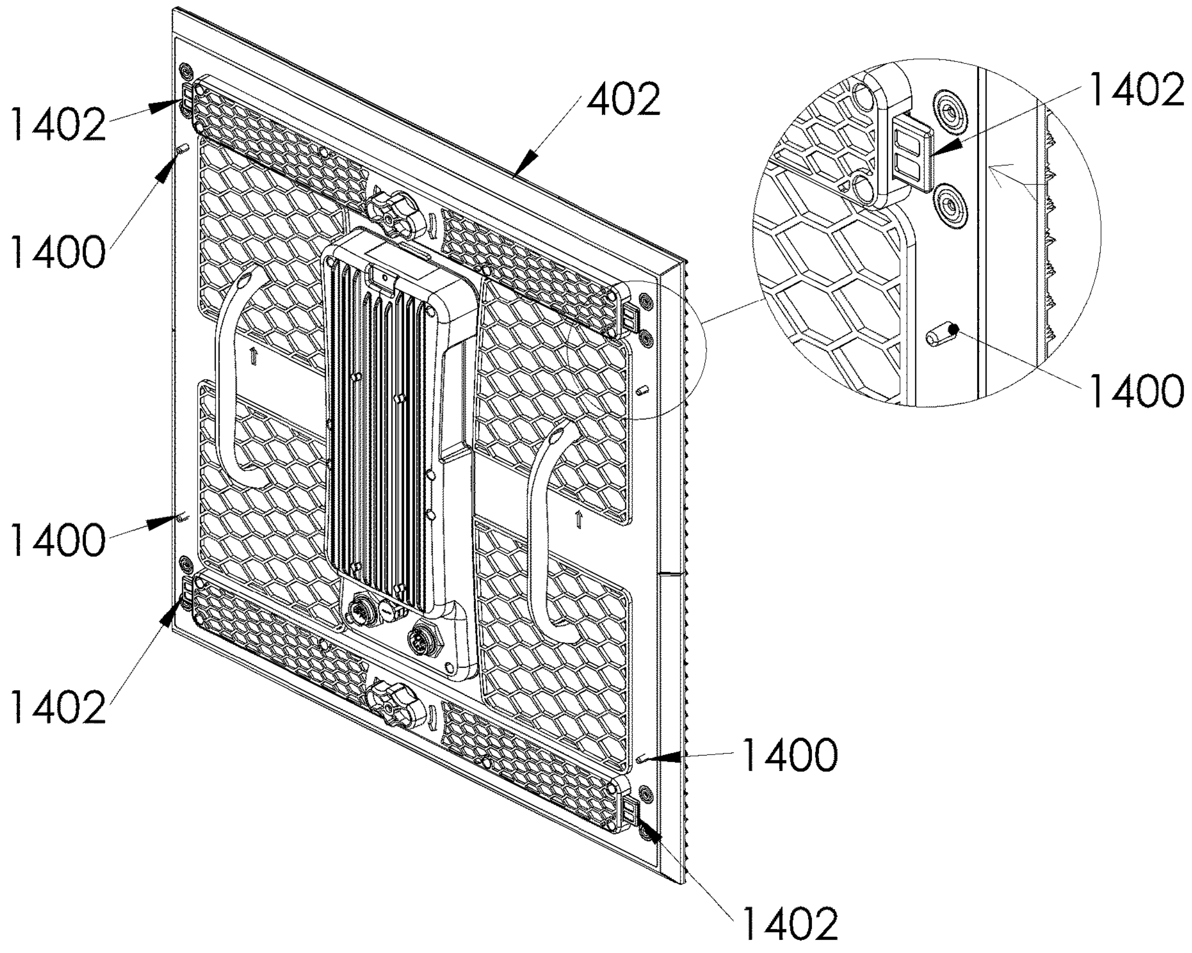
FIG. 14*a* is an isometric view of the rear of an LED panel.
Figure 14B:
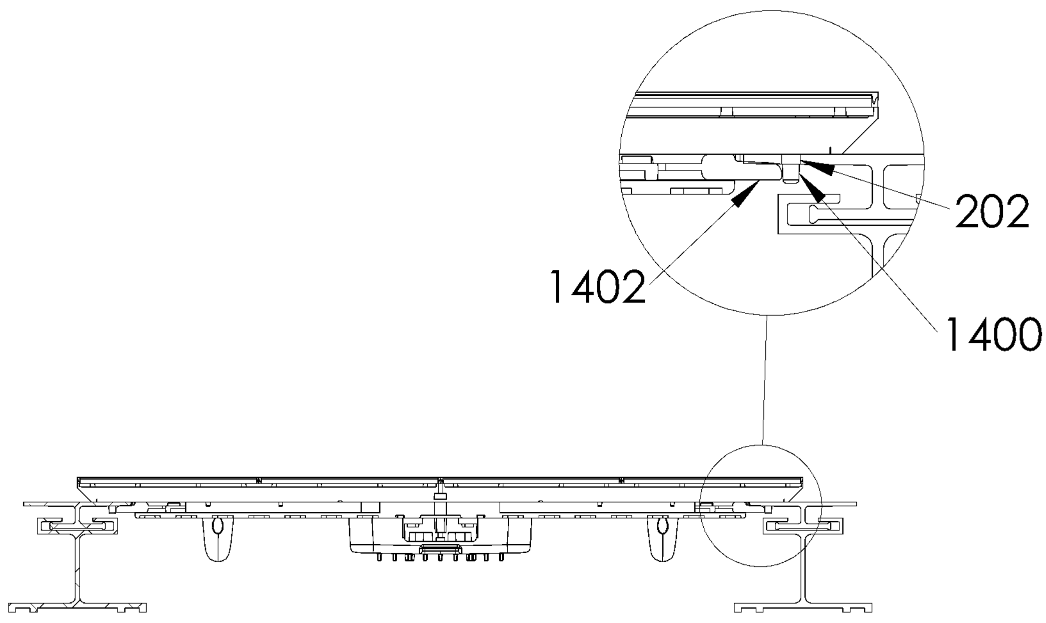
FIG. 14*b* is an end view of the LED panel mounted to two rail assemblies.

The attachment flange 206 is designed to mount the LED panels 902. Referring to FIG. 14*a*, each LED panel 902 has a plurality of alignment spigots on the rear of the panel. The attachment flange 206 may include post machined attachment holes or apertures 202 to mate with the alignment spigots 1400 on the LED panel 902 and govern the position in the XY plane of each LED panel 902 relative to its neighbours. The attachment flange 206 is located between two LED panels 902 on the same row in the X axis and the edges of both LED panels 902 attach to each attachment flange 206; one on the left hand side and one on the right hand side. The horizontal positioning of an LED panel 902 with respect to its horizontal neighbour is determined by the accuracy of the post machining of the alignment holes 202 in each attachment flange 206, ensuring accurate relative positioning of each LED panel 902 to each other in the X axis. Furthermore, as the positioning of the LED panels 902 in the Y axis is facilitated by alignment holes 202 on each attachment flange 206, this accuracy governs the accuracy of the relative positioning of each LED panel 902 to its neighbour in the Y axis. With modern CNC machine equipment, accurate tolerances between hole centres are readily achievable. For example, the alignment holes have a diameter of 5 mm and are post machined to a tolerance of 0.05 mm, 0.1 mm or 0.5 mm.

For example, if the mounting member is constructed from 6060-T5 aluminium alloy, it may be designed with:

An attachment flange 206 of width 64 mm and a nominal thickness of 2.5 mm.

An interconnecting web 210 of height 12.5 mm and thickness 3 mm.

An interface flange 204 of width 38 mm and nominal thickness of 3 mm.

Figure 3A:
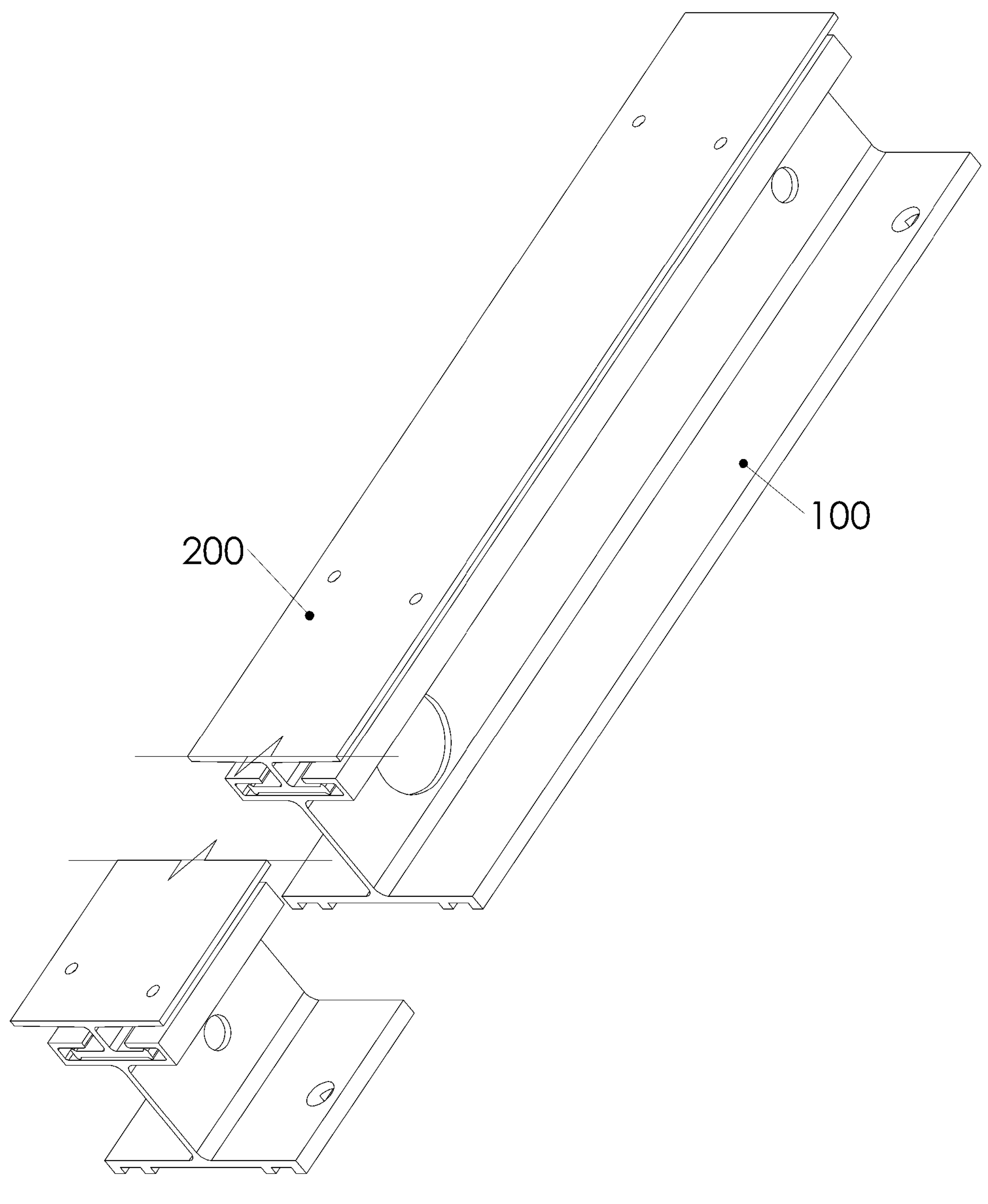
FIG. 3*a* is an isometric view of the structure and mounting members of an embodiment of the display mounting system interconnected.

Referring to FIGS. 3*a* and 3*b*, structural member 100 and the mounting member 200 slot together along the Y axis by inserting the interface flange 204 of the mounting member 200 into the receiving recess 102 of the structural member 100 and sliding the mounting member 200 down the length of the structural member 100 until the interface flange 204 is substantially engaged along the length of the receiving recess 102.

If the members 100, 200 are constructed from extruded aluminium, and the interface flange 204 is flat, there is a high risk of the interface flange 204 binding to the inside of the receiving recess 102, especially as the contact surface area will be large. To reduce the effects of binding, the interface flange 204 may have bulbed edges 208 to significantly reduce the surface area of the interface flange 204 that may contact the inside of the receiving recess 102 as only the tip of the bulb 208 will make contact. The height from the base of the bulb to the top does not need to be large, and may provide a sufficient gap to ensure that the majority of the surface of the interface flange 204 does not come into contact with the receiving recess 102. In one embodiment, detailed in FIG. 3*c*, the cross sectional width of the receiving bulb is 5 mm and the internal dimension in the Z axis of the receiving recess 102 is 6 mm, providing a total gap of 1 mm.

Both the structural member 100 and mounting members 200 may be anodized to further reduce binding between the interface flange 204 and the receiving recess 102 during assembly and when in operation. The receiving recess 102 may furthermore include Teflon® or another low resistance bushes configured to reduce the mounting member 200 binding to the structural member 100 as it is installed.

The interface flange 204 may also have a rubber coating to avoid the mounting member 200 vibrating in or moving with wind. Alternatively, silicon may be injected into the coupling after installation to avoid vibration.

Referring to FIG. 3*b*, structural member 100 and mounting member 200 are loosely coupled, and mounting member 200 may move substantially in the X axis. The degree of movement in the X axis is governed by the width of the interconnecting web 210 on the mounting member 200 and the width of the slot in the receiving recess 102. For example, if the width of the interconnecting web 210 is 3 mm and the width of the slot is 21 mm, the mounting member 200 is free to move +/−6 mm from the centre in the X axis. FIG. 3*b* details three configurations; one where the mounting member 200 is displaced with respect to the structural member to the extreme left, on where it is in the middle, and one where it is to the right. It can be seen here that the width of the interface flange 204 is sufficient to ensure that it remains always engaged with receiving recess 102 no matter its X translation.

Figure 3C:
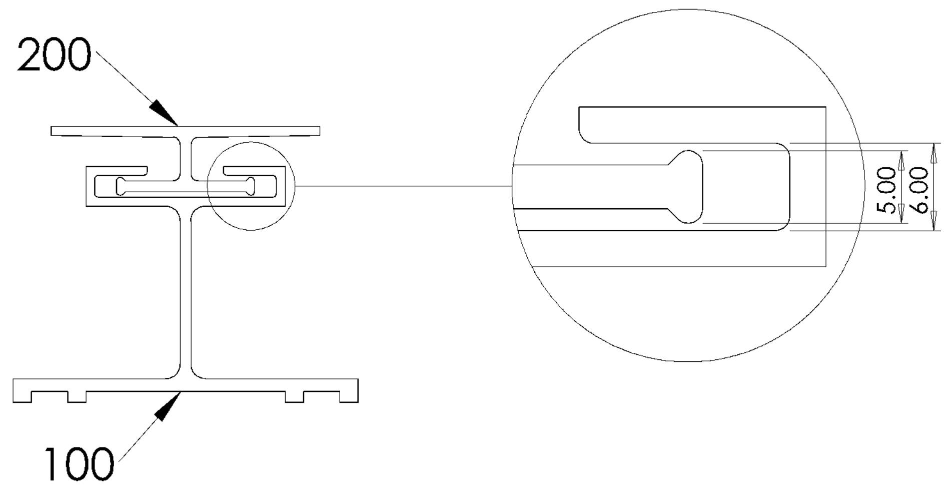
FIG. 3*c* is an end view of a structure and mounting member of an embodiment of the display mounting system interconnected.

Referring to FIG. 3*c*, sufficient clearance and movement in the Z axis, as well as minor Z axis rotation, may also be permitted between the interface flange 204 and receiving recess 102. This is to allow for minor tolerances during installation as well as for tolerance in the extrusion flatness along the length of the member. For example, where the maximum extrusion length is 6 m, this gap may be set to 0.5 mm on both sides of the bulb 208.

The construction referred to in FIGS. 3*a*, 3*b* and 3*c* may allow Z axis load experienced by the mounting member 200, for example due to wind loading on the LED panel 902 coupled to the attachment flange 206, to be transferred into the structural member 100. The loose coupling may provide accommodation for production tolerances, installation tolerances, and/or movement during operation due to effects such thermal expansion and contraction.

Thermal considerations may sometimes be important, particularly for outdoor installations; due to differences in coefficients of thermal expansion between materials, as well as differences in temperature due to interaction between components. Considering a simplified case of a screen mounted on a wall, where the wall is made from concrete with a nominal coefficient of thermal expansion of $10\times10^{-6}K^{-1}$ and the LED panels 902 are made from 30% glass filled polycarbonate with a nominal coefficient of thermal expansion of $30\times10^{-6}K^{-1}$. During a 12-hour period the LED panels 902 will be directly exposed to the sun and may encounter temperature variation of up to 80° C. due to changes in ambient temperature and thermal loading. The concrete wall is shaded from the sun by the screen so is only subject to changes in ambient temperature over the same 12-hour period of 25° C. For a screen that is 5 m wide, the concrete will expand by 1.25 mm and the plastic will expand by 12 mm. The difference is 10.75 mm or +/−5.375 mm. A loosely coupled frame solution may facilitate sufficient movement in the frame structure to accommodate this difference in expansion without subjecting the LED panels 902 to stress.

Figure 4A:
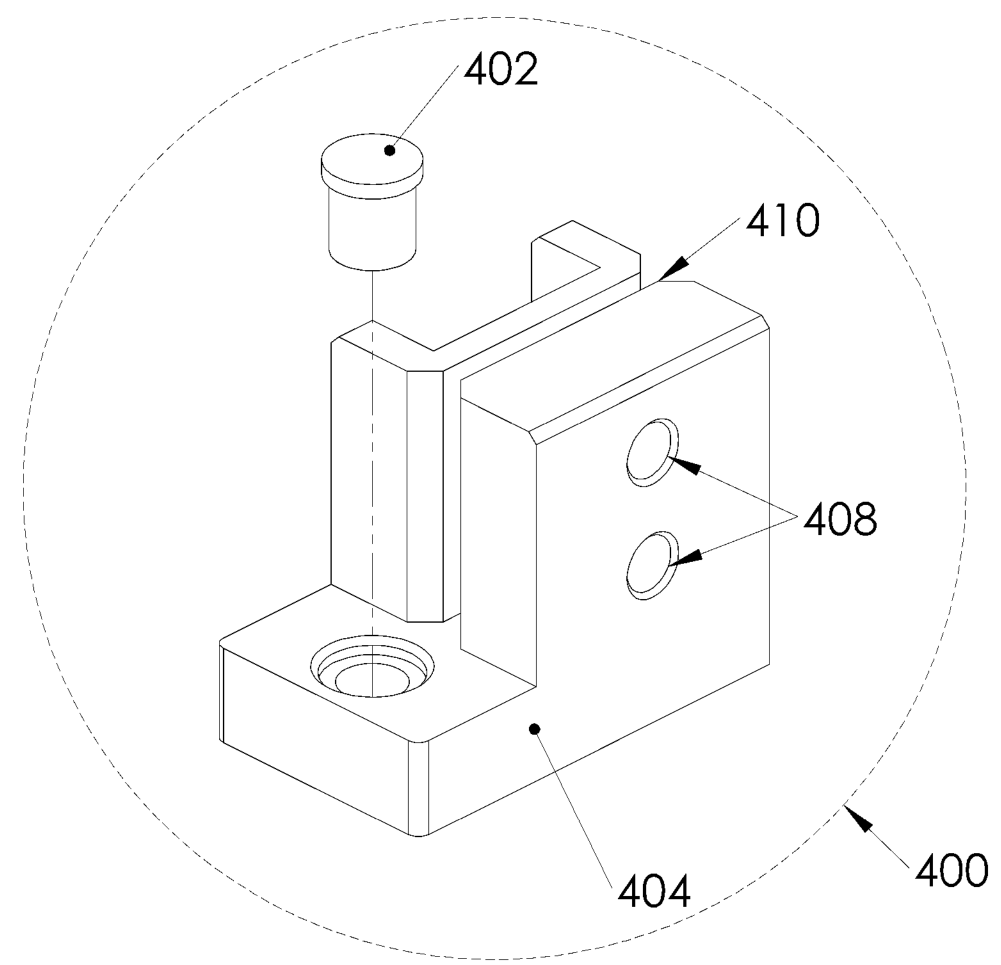
FIG. 4*a* is an top exploded isometric view of an end stop and grub screw.
Figure 4B:
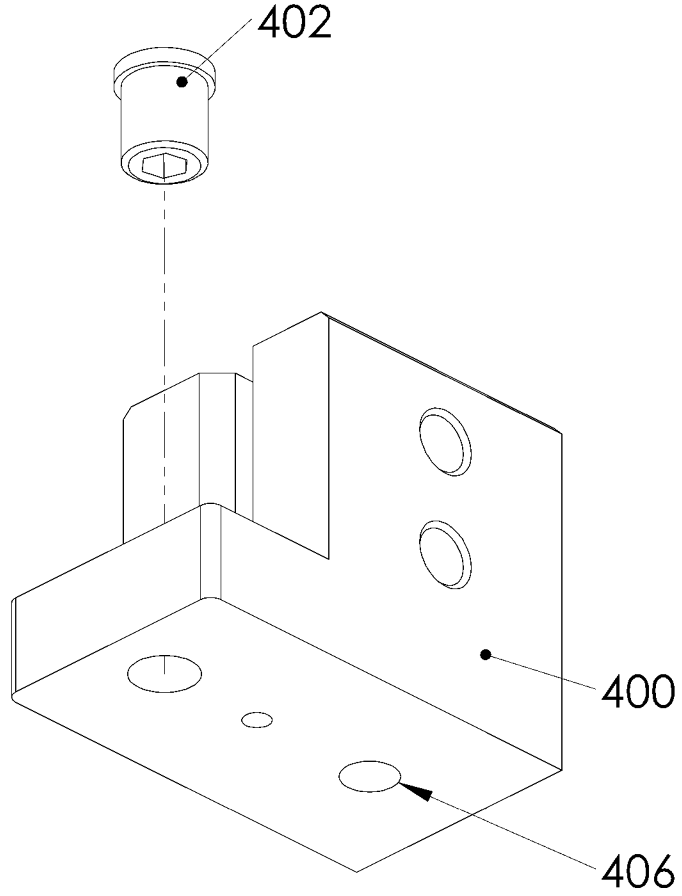
FIG. 4*b* is a bottom exploded isometric view of an end stop and grub screw.
Figure 5:
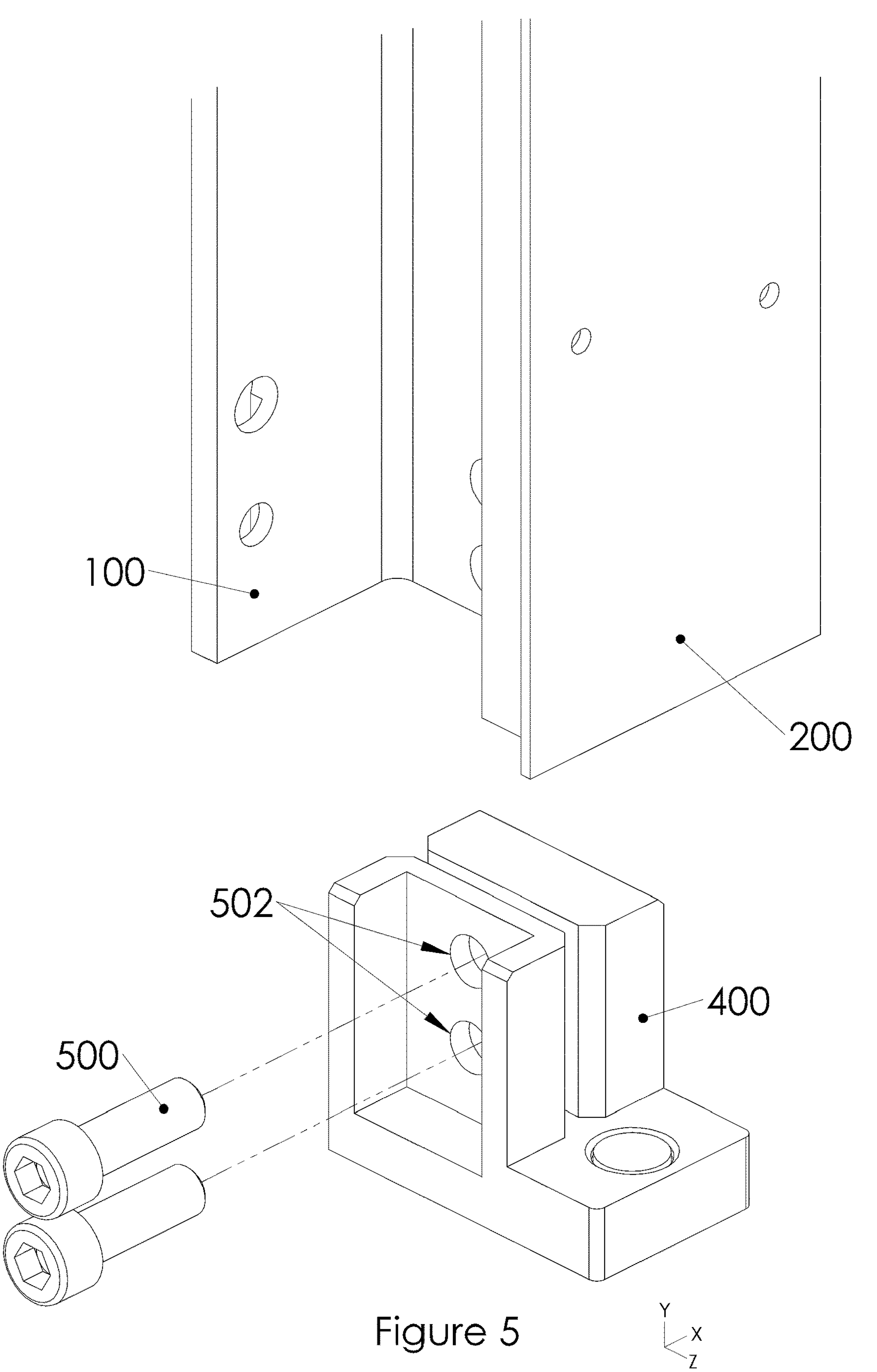
FIG. 5 is an exploded isometric view of an end stop attached to the structure and mounting members.
Figure 6:
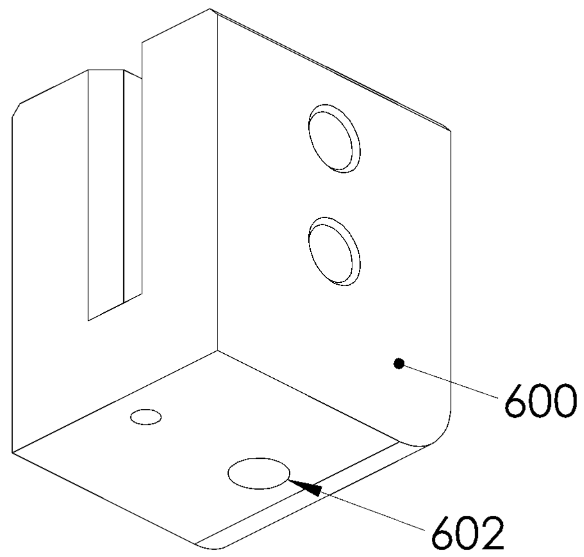
FIG. 6 is an isometric view of a top stop.

Referring to FIGS. 4(*a*), 4(*b*) and 5, an end stop 400 is fastened to the bottom of each structural members 100 in order to retain the mounting member 200 in the receiving recess 102 of the structural member. The end stop 400 has a lower lip 404 that extends out to make contact with the bottom end of the mounting member 200 when installed. Without the end stop installed, the mounting member 200 would fall out of the receiving recess 102 due to gravity. To allow for minor adjustments in the Y-axis, to accommodate tolerances in the frame assembly and mounting to a substructure, a grub screw 402 in the end stop 400 can be used to adjust the offset from the top of the lower lip 404 of the end stop to the bottom end of the mounting member 200. The end stop has a slot 410 to accommodate the interconnecting web 116 when mated with the structural member 100. The end stop 400 is secured to the bottom of each structural member 100 using machine screws 500 as shown in FIG. 5. The machine screws 500 may pass through holes 502 on one side of the end stop, through the end stop holes 118 in the structural member 100 and into threaded holes 408 on the other side of the end stop. For example the machine screws 500 may be M10 stainless steel cap screws and the slot 410 may be of width 3.2 mm to accommodate an extrusion with interconnecting web 116 thickness of 3 mm. A top stop 600 can be mounted at the top of each structural member as shown in FIG. 6 and attached in a similar fashion to the end stop. Both end stop 400 and top stop 600 have may have threaded holes 406, 602, to facilitate fastening the completed rail assemblies 700, 800 to a mounting angle 1204. For example, the thread of holes 406 and 602 accommodates a countersunk M10 stainless steel screw.

Figure 7:
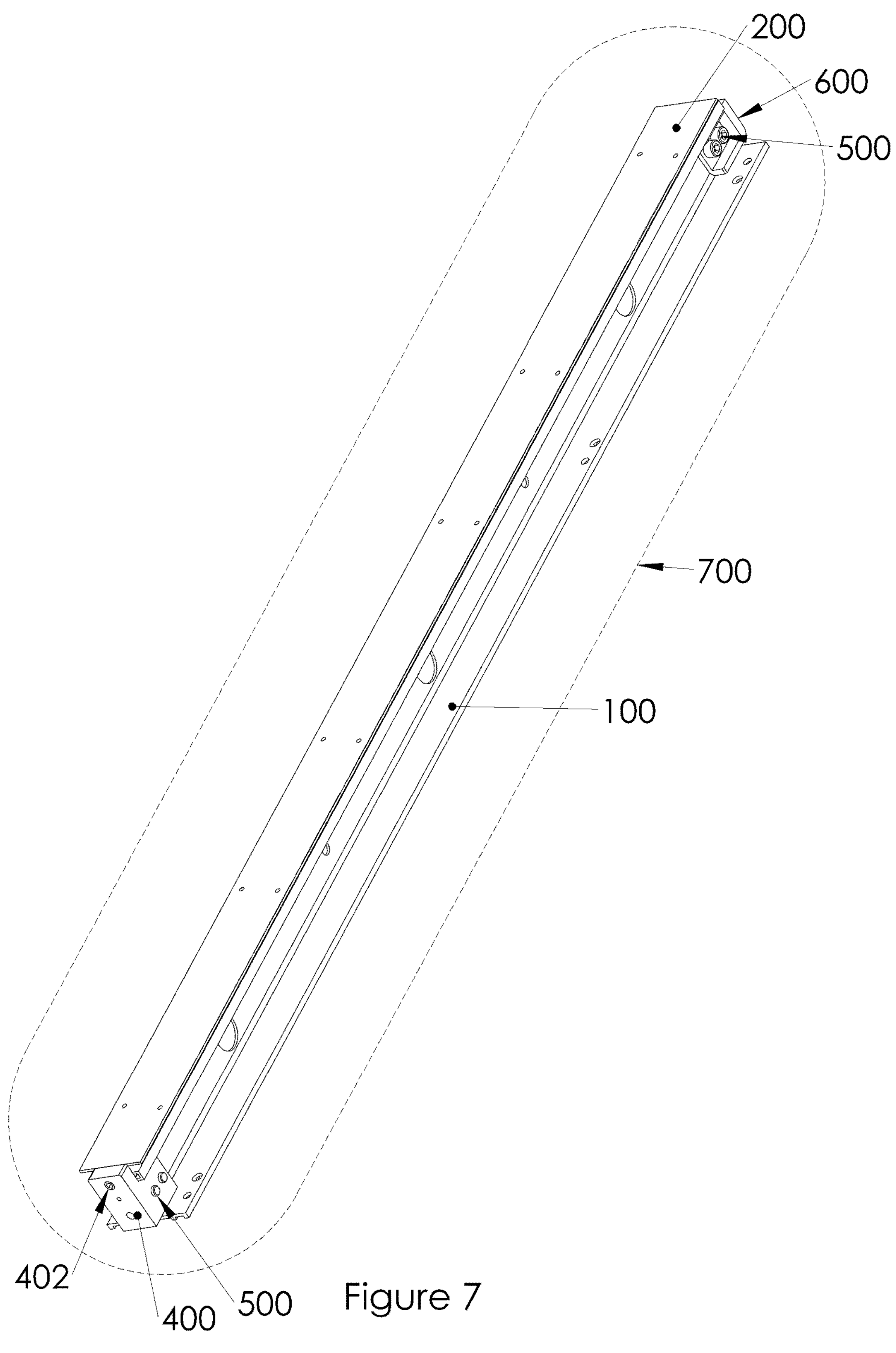
FIG. 7 is an isometric view of a standard rail assembly.

A standard rail assembly 700 as shown in FIG. 7, consists of a structural member 100, mounting member 200, end stop 400, grub screw 402, top stop 600 and fasteners 500. The rail assembly 700 as shown in FIG. 7 is located between two panels 902 in the X axis when assembled into a frame 904 as shown in FIG. 9.

Figure 8:
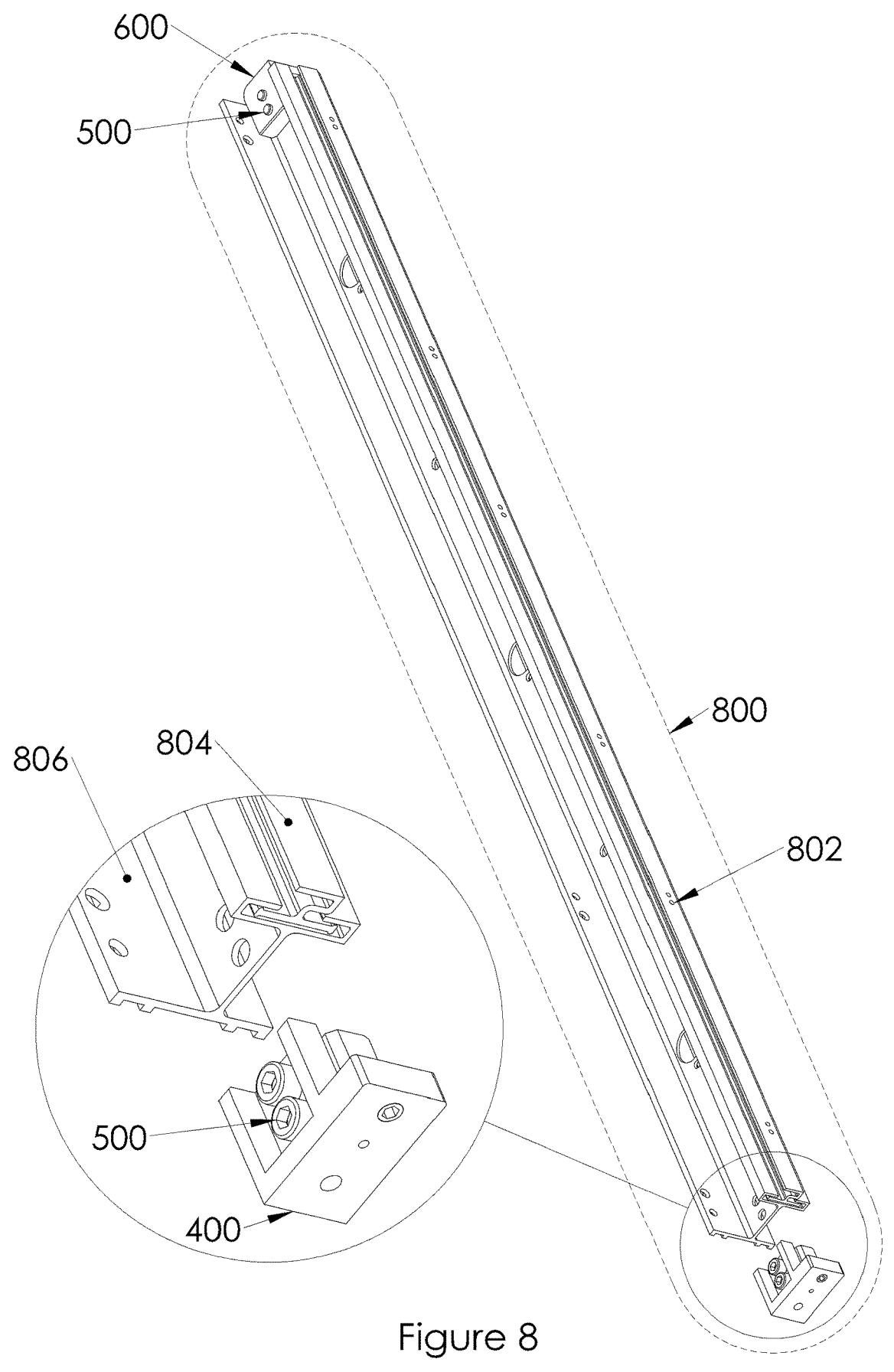

A frame 904 may be entirely constructed from standard rail assemblies 700, however in this case the rail assemblies 700 at either edge of the screen will protrude from the boundary formed by the LED panels 902 which may be undesirable for aesthetic reasons. To address this issue, offset rail assemblies 800 as shown in FIG. 8 may be used at the edges of the screen, in combination with the standard rail assemblies 700, as shown in FIG. 9. An offset rail assembly consists of; an offset structural member 806, an offset mounting member 804, an end stop 400, grub screw 402, top stop 600 and machine screws 500 to mount the top and end stops to the offset structural member 806. As an offset rail assembly attaches to one LED panel per row, only one set of alignment holes 802 per LED panel in the offset attachment flange 808 are required.

The configuration of the offset rail assembly 800 may be different depending on whether the offset rail assembly 800 is located on the left or right hand side of the screen. To adjust a rail assembly to be suitable for the alternate side of the screen, the end stop and top stop can be swapped and the offset rail assembly rotated 180 degrees around the Z axis. Additional alignment holes 802 may be required to ensure that the offset attachment flange can accommodate the alignment spigots of the LED panels in both configurations if the alignment spigots are asymmetrical.

Figure 9:
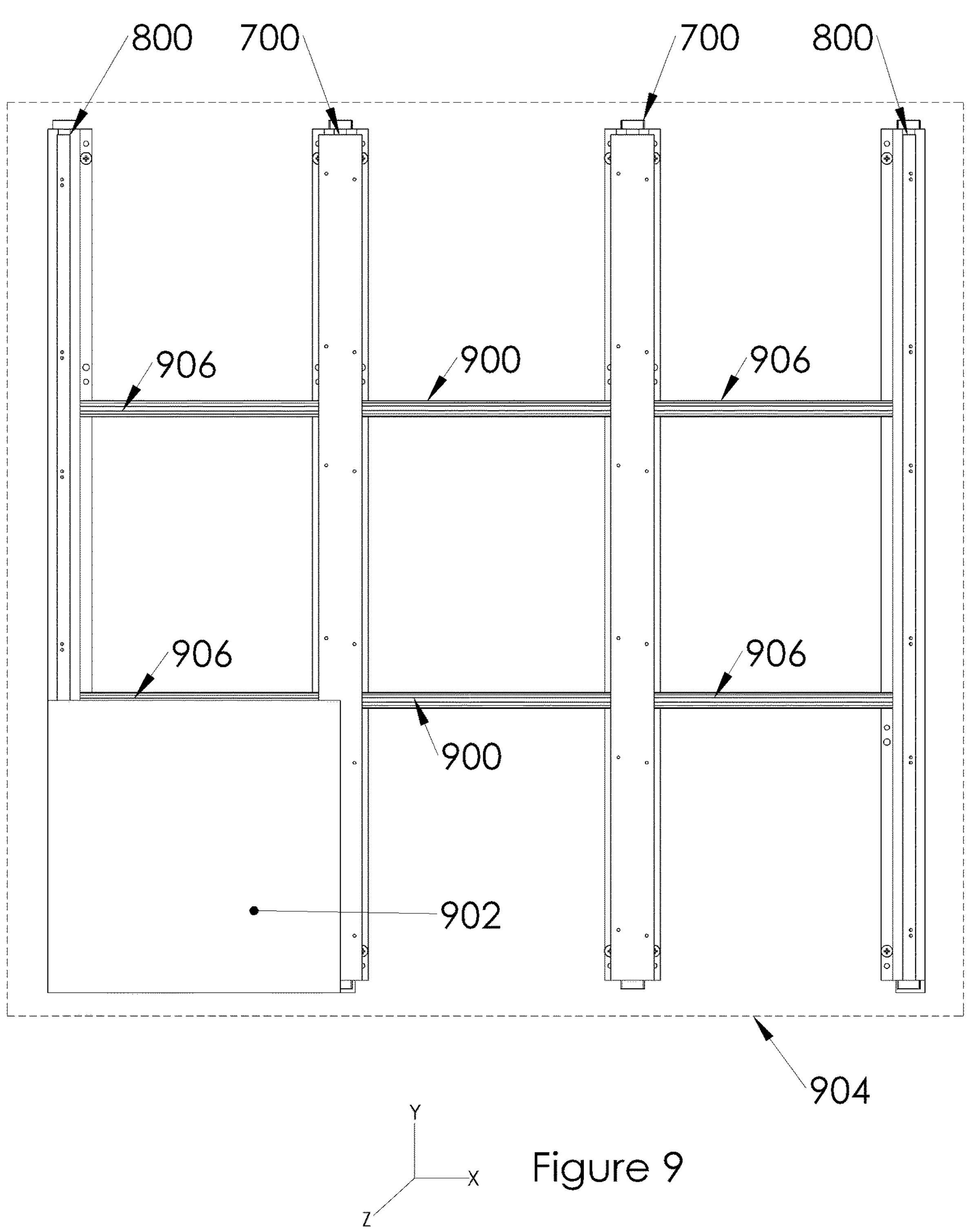
FIG. 9 is a front view of an embodiment of the display mounting system, with one LED panel shown mounted.

Referring to FIG. 9, the rail assemblies 700 and 800 are positioned vertically parallel to each other and are connected using horizontal spacers 900 and 906 to make up a base frame 904. The horizontal spacers mate with holes 104 in webs of the rail assemblies 700 and 800. The horizontal spacers 900 and are set to a length such that the centrelines of each of the rail assembles 700 are nominally spaced to the X size or width of the LED panel 902. For example, where the X dimension of the LED panel 902 is 500 mm and the width of the internal web 116 of the structural member 100 is 3 mm, the length of the horizontal spacer 900 may be 497 +/−0.1 mm. Machined holes 104 being at the same height on each structural member 100 and 806 additionally ensure that these members are also nominally at the same height, ensuring nominal alignment between the rail assemblies 700 and 800 in the Y axis. The offset rail assemblies 800 may need to be spaced relative to the neighbouring standard rail assembly 700 at a different spacing than required between two standard rail assemblies. This may be facilitated though the use of offset horizontal spacers 906 that may be of different length to the horizontal spacers 900.

Figure 10:
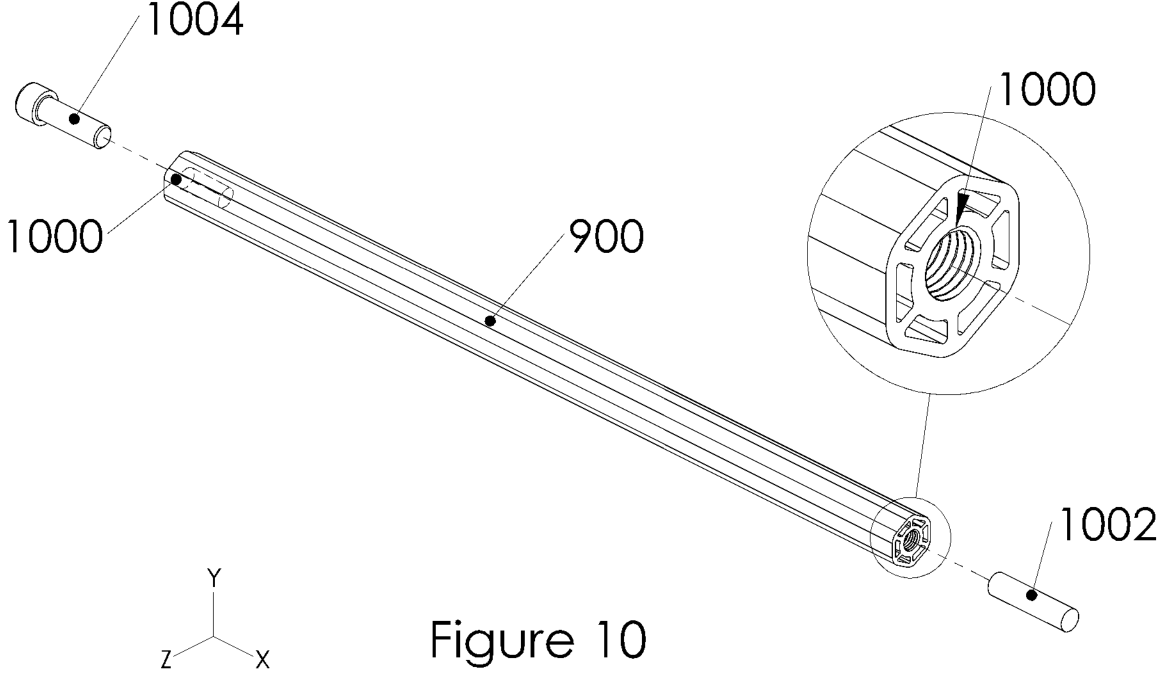
FIG. 10 is an exploded isometric view of a horizontal spacer and various fixing components.
Figure 11A:
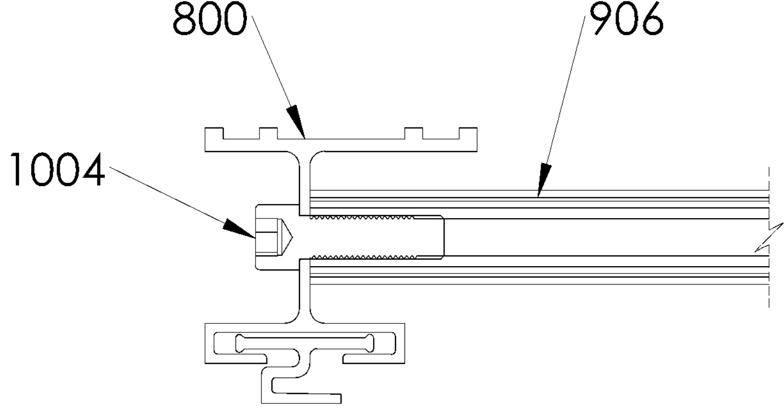
FIG. 11*a* is a cross sectional top view of an offset rail assembly and offset horizontal spacer.

Referring to FIG. 10, at both ends of the horizontal spacer 900, 906 are threaded holes 1000 that accommodates either a section of threaded rod 1002 or a machine screw 1004. For example, the threaded rod 1002 may have an M12 thread with length of 50 mm and machine screw 1004 would be a stainless steel cap screw of thread M12 and length 35 mm. The holes 1000 would be tapped to accommodate the M12 thread. Referring to FIG. 11*a*, an offset horizontal spacer 906 would be attached to the structural member 806 using machine screw 1004. As the head of the machine screw is accessible from the side of the screen, this can be readily tightened. In order to connect two horizontal spacers together with a standard rail assembly 700 in between, a section of threaded rod 1002 is used as shown in FIG. 11*b*.

Figure 11B:
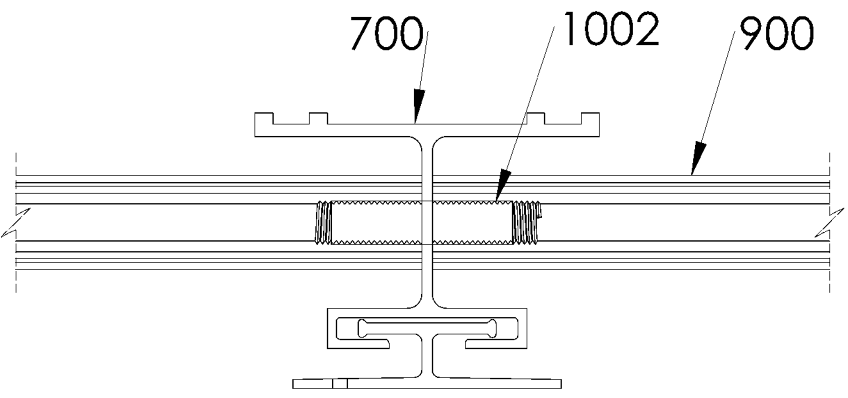
FIG. 11*b* is a cross sectional top view of a standard rail assembly and two horizontal spacers.
Figure 11C:
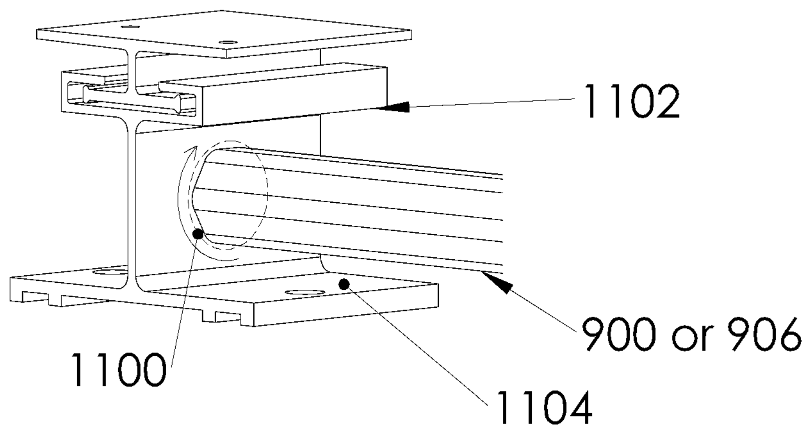
FIG. 11*c* is an isometric cross sectional view of a horizontal spacer coupled to a standard rail assembly.

Referring to FIG. 11*c*, the maximum external diameter 1100 of the horizontal spacers 906 and 900 must not exceed the distance between the internal face 1104 of the mounting flange 108 and the internal face 1102 of the receiving flange 110 to allow the horizontal spacer to be rotated to engage the threaded rod 1002 and be tightened to fasten both horizontal spacers 900 and the standard rail assembly 700. For example, where the distance between internal faces 1104 and 1102 is 47.5 mm the maximum diameter of the horizontal spacer 900 and 906 may be 28.2 mm. Furthermore, the ends of the horizontal spacer 900, 906 are machined perpendicular to the length of the spacer and parallel to each other with sufficient surface area to hold the structural members 100 nominally parallel to each other when tightened.

The horizontal spacer 900 or 906 may be a hexagonal or octagonal profile to allow easy tightening, especially where a threaded rod 1002 is used to connect two horizontal spacers 900 with a symmetrical rail assembly 700 in between as shown in FIG. 11*b*.

At least two rows of horizontal spacers 900, 906 are required between each pair of structural members 100, 806, typically at the top and bottom of the frame, to ensure the structural members 100, 806 are nominally parallel to each other. More than 2 horizontal spacers 900, 906 may be used to increase overall rigidity and strength if required. This may secure the nominal X and Y relationship between the structural members 100, 806 creating the base frame 904 for the LED screen.

The LED panels 902 shown in FIG. 14*a* have 2 or more Alignment Spigots 1400 and a sliding lock mechanism 1402 that can be engaged to secure the LED panel 902 to the frame 904. LED panels 902 are then attached to the mounting member 200. The alignment spigots 1400 on the rear of the LED panels 902 engage with pre machined holes 202, 802 in the mounting member 200 to assure relative alignment and positioning in the X and Y access between LED panels 902. The LED panels 902 are secured to the mounting members 200 using the sliding lock mechanism 1402 on the back of the LED panel 902 that engage with the inside edge of the attachment flanges 206, 808. The sliding lock mechanism 1402 provides sufficient engagement force to ensure that the front plane of the LED panels 902 are secured parallel to the front surface of the attachment flanges 206 and 808. This maintains co-planarity of the surfaces of the LED Panels 902.

The structure members 100, 806 are nominally spaced at the correct X-axis spacing. As the mounting members 200, 804 are free to move relative to each other in the X-axis, the mounting members 200, 804 may move as LED panels 902 are installed. As all the LED panels 902 are installed the mounting members 200, 804 will all naturally align to space the LED panels 902 correctly.

A silicon compound may be added into the structural member slot 102 at various points to minimize any potential rattling.

Installing the display mounting system, may be implemented similar to a curtain wall framing system: where the framing members are installed plumb, level and flat; regardless of what how flat the existing substrate wall/structure is.

The designated wall or structure is assessed for coplanarity/flatness to determine the nominal level of packing required. A level line is then marked on the wall at the nominated position of the top of the screen. The pre-assembled framework is then lifted into position on the wall. Depending on the size/weight of the frame this can be done by hand, or by using a crane or chain blocks.

On a wall or structure that has been determined to be suitably flat the display mounting system can be fastened directly to the face using the appropriate fasteners for the type of wall system according to the specific engineering requirements (masonry anchors into concrete/brick; coach screws into timber framing or timber cladding, or tek screws into steelwork or steel framing).

Where there is sufficient variance in the face of the wall to cause alignment issues in the z axis, packers 1214 of a given thickness to overcome this variance would be used in the top left and top right comers. The framework would be aligned with the marked top-level line and fastened off in the top two corners using the appropriate fasteners. A PLS laser level or string-line is then used to determine the flatness of the frame along the top edge. Suitable packers 1214 are inserted, and the mounting flange and/or structural members are fastened off along the top edge, while ensuring the mounting members are aligned with the marked horizontal level line.

The bottom left and right corners are then packed to ensure the structural members are plumb and perpendicular to the top horizontal line and fastened off. A PLS laser level or string-line is then used to determine the flatness of the frame along the bottom edge. Suitable packers 1214 are inserted, and the mounting flange and/or structural members are fastened off along the bottom edge.

Laser lines or string-lines are then cast diagonally across the face of the screen to ensure flatness between the top right and bottom left corners, and top left and bottom right comers. Packers 1214 are inserted in the mid points of the screen as required to maintain flatness and fastened off according to engineers' specifications.

Figure 12:
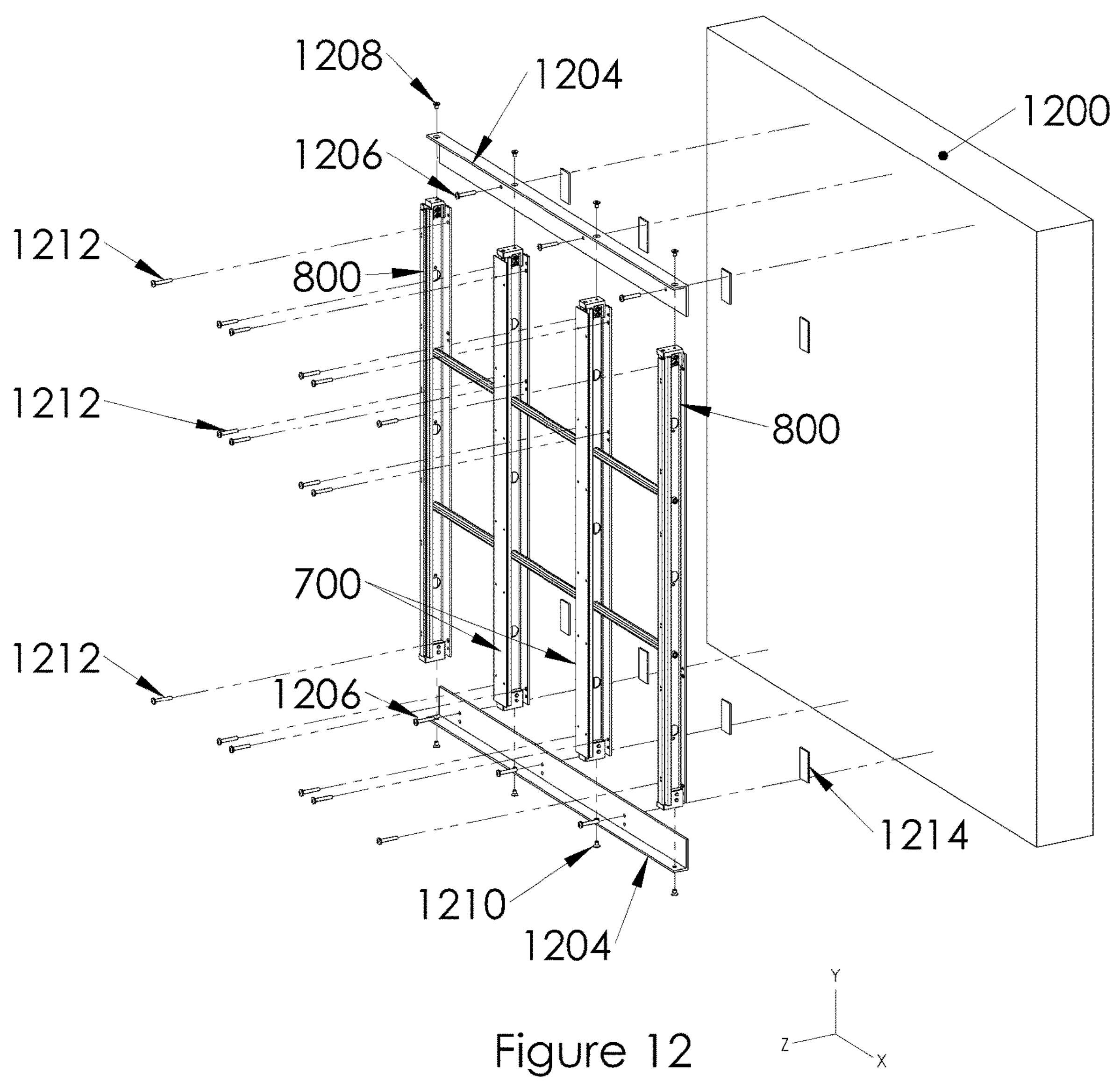
FIG. 12 is an expanded view of an embodiment of the display mounting system mounted onto a wall.
Figure 13:
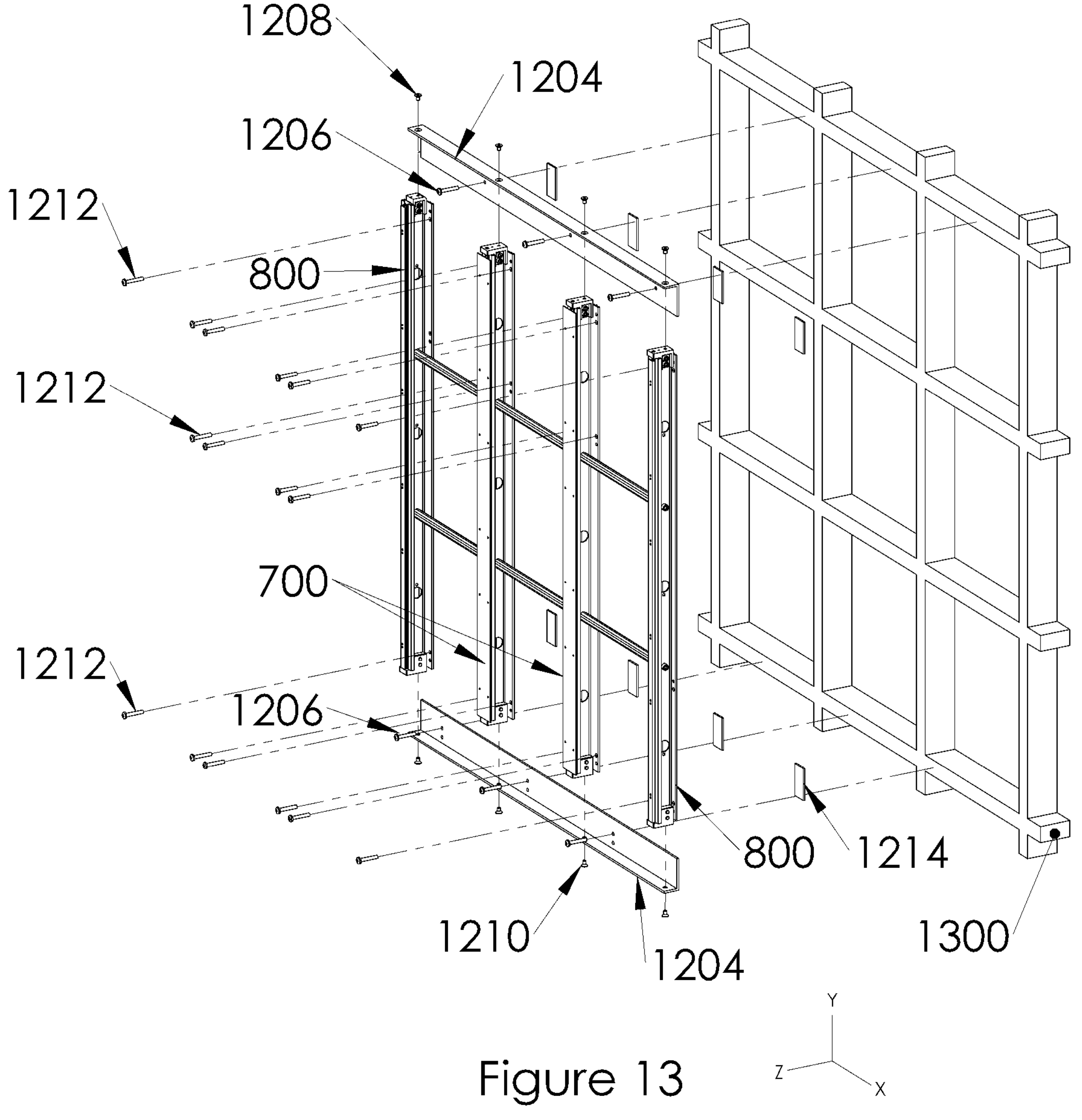
FIG. 13 is an expanded view of an embodiment of the display mounting system mounted onto a substructure.

Referring to FIG. 12, a method of assembly for the base frame 904 on the ground (or pre-assembled in a factory) and then mounted on a wall may include:

1. Assemble standard rail assemblies 700 by firstly inserting interface flange 204 of mounting members 200 into receiving recess 102 of structural members 100;
2. Add end stop 400 and top stop 600 using fasteners 500 to complete the standard rail assemblies 700;
3. Assemble offset rail assemblies 800 by coupling offset mounting members 804 to offset structural members 806 in a similar fashion to step 1. Assemble one for the left-hand side of the screen and one for the right-hand side of the screen;
4. Add end stop 400 and top stop 600 using fasteners 500 to complete the offset rail assemblies 800;
5. Attach offset horizontal spacers 906 to the top and bottom of the right-hand side of the left-hand offset rail assembly 800 by passing machine screws 1004 through the appropriate alignment holes in the offset structural member 806 and screwing into the threaded hole 1000 at one end of each horizontal spacer 906;
6. Screw in threaded rod sections 1002 to the threaded hole 1000 at the other end of the offset horizontal spacers 906 to a depth where approximately 50% of the length of each threaded rod section 1002 protrudes from the end of each offset horizontal spacer 906;
7. Pass the exposed threaded rod sections 1002 through alignment holes 102 in structural member 100 of standard rail assembly 700;
8. Screw a horizontal spacer 900 to the remaining length of each threaded rod section 1002 and tighten;
9. Screw in threaded rod sections 1002 to the threaded hole 1000 at the other end of the horizontal spacers 900 to a depth where approximately 50% of the length of each threaded rod section 1002 protrudes from the end of each horizontal spacer 900;
10. Repeat from step 7 until the second to last standard rail assembly 700 is installed;
11. Pass the exposed threaded rod sections 1002 through alignment holes 102 in structural member 100 of last standard rail assembly 700;
12. Screw an offset horizontal spacer 906 to the remaining length of each threaded rod section 1002 and tighten;
13. Attach the right-hand side offset rail assembly to the offset horizontal spacers 906 by passing machine screws 1004 through the appropriate alignment holes in the offset structural member 806 and screwing into the threaded hole 1000 at the exposed end of each horizontal spacer 906;
14. Base frame 904 is now full assembled.
15. Using a string line or PLS laser mark a line on the wall 1200 where the top of the screen is to be located;
16. Attach the top mounting angle 1204 to the wall using fasteners 1206 (e.g. masonry anchors for a concrete wall or self tapping wood screws for a wooden wall). Use packers 1214 if required to accommodate any unevenness in the wall 1200;
17. Using a lifting device such as a crane or chain blocks, lift frame 904 into place. Align top stop attachment holes 602 to pre-drilled holes in mounting angle 1204 and fasten using fasteners 1208;
18. Attach lower mounting angle 1204 to the base of the frame 904. Align pre-drilled holes in mounting angle 1204 to end stop attachment holes 406 in each end stop and secure using fasteners 1210;
19. Fasten lower mounting angle 1204 to the wall 1200 using fasteners 1206. Use packers 1214 if required to accommodate any unevenness in the wall 1200;
20. Using a string line or PLS laser ensure base frame 904 is level, all rail assemblies 700, 800 are plumb and front surfaces of attachment flanges 206, 808 are nominally co-planar;
21. Fasteners 1212 (e.g. Tekhead screws, masonry anchors or wood screws) may be used at the top and bottom of each rail assembly 700, 800 to fasten structural members 100, 806 through the mounting angles 1204 into the wall 1200 for further strength;
22. Additional fasteners 1212 may be used in additional locations along the length of the structural members 100, 806 for further strength as required;
23. If required, adjust grub screws 402 in each rail assembly to ensure mounting members 200, 804 are at the same level;
24. Add LED panels 902 and cabling.

For some applications, assembly on the ground is not viable and the frame 904 needs to be installed in-situ (e.g. where site access restrictions prohibit the use of lifting equipment or where the frame is attached to an existing wall or wooden billboard structure accessed via temporary work platforms such as a cherry picker or scissor lift). A method of assembly for the base frame 904 off the ground may include:

1. Assemble standard rail assemblies 700 by firstly inserting interface flange 204 of mounting members 200 into receiving recess 102 of structural members 100;

2. Add end stop 400 and top stop 600 using fasteners 500 to complete the standard rail assemblies 700;
3. Assemble offset rail assemblies 800 by coupling offset mounting members 804 to offset structural members 806 in a similar fashion to step 1. Assemble one for the left-hand side of the screen and one for the right-hand side of the screen;
4. Add end stop 400 and top stop 600 using fasteners 500 to complete the offset rail assemblies 800;
5. Using a string line or PLS laser mark a line on the wall 1200 where the top of the screen is to be located;
6. Attach the top mounting angle 1204 to the wall using fasteners 1206. Use packers 1214 if required to accommodate any unevenness in the wall 1200;
7. Lift the left hand offset rail assembly 800 to the left hand side of top mounting angle 1204 so that top stop attachment hole 602 aligns to a pre-drilled hole in mounting angle 1204 and fasten using top stop fastener 1208.
8. Attach offset horizontal spacers 906 to the top and bottom of the right-hand side of the left-hand offset rail assembly 800 by passing machine screws 1004 through the appropriate alignment holes in the offset structural member 806 and screwing into the threaded hole 1000 at one end of each horizontal spacer 906;
9. Screw in threaded rod sections 1002 to the threaded hole 1000 at the other end of the offset horizontal spacers 906 to a depth where approximately 50% of the length of each threaded rod section 1002 protrudes from the end of each offset horizontal spacer 906;
10. Lift standard rail assembly 700 into place and pass the exposed threaded rod sections 1002 through alignment holes 102 in structural member 100 of standard rail assembly 700;
11. Secure standard rail assembly 700 to the top mounting angle 1204 by aligning top stop attachment hole 602 to a pre-drilled hole in mounting angle 1204 and fasten using top stop fastener 1208.
12. Screw a horizontal spacer 900 to the remaining length of each threaded rod section 1002 and tighten;
13. Screw in threaded rod sections 1002 to the threaded hole 1000 at the other end of the horizontal spacers 900 to a depth where approximately 50% of the length of each threaded rod section 1002 protrudes from the end of each horizontal spacer 900;
14. Repeat from step 10 until the second to last standard rail assembly 700 is installed;
15. Pass the exposed threaded rod sections 1002 through alignment holes 102 in structural member 100 of the last standard rail assembly 700;
16. Secure standard rail assembly 700 to the top mounting angle 1204 by aligning top stop attachment hole 602 to a pre-drilled hole in mounting angle 204 and fasten using top stop fastener 1208.
17. Screw an offset horizontal spacer 906 to the remaining length of each threaded rod section 1002 and tighten;
18. Fasten the right-hand side offset assembly to the right-hand side of top mounting angle 1204 by aligning top stop attachment hole 602 to a pre-drilled hole in mounting angle 204 and fasten using top stop fastener 1208;
19. Attach the right-hand side offset rail assembly 800 to the offset horizontal spacers 906 by passing machine screws 1004 through the appropriate alignment holes in the offset structural member 806 and screwing into the threaded hole 1000 at one end of each horizontal spacer 906;
20. Attach lower mounting angle 1204 to the base of the frame by aligning pre-drilled holes in lower mounting angle 1204 to the end stop attachment holes as the base of each rail assembly 700, 800 and secure with fasteners 1210.
21. Fasten lower mounting angle 1204 to the wall using fasteners 1206. Use packers 1214 if required to accommodate any unevenness in the wall 1200;
22. Using a string line or PLS laser ensure base frame 904 is level, all rail assemblies 700, 800 are plumb and front surfaces of attachment flanges 206, 808 are nominally co-planar;
23. Fasteners 1212 may be used at the top and bottom of each rail assembly 700, 800 to fasten structural members 100, 806 through the mounting angles 1204 into the wall 1200 for further strength;
24. Additional fasteners 1212 may be used in additional locations along the length of the structural members 100, 806 for further strength as required;
25. If required, adjust grub screws 402 in each rail assembly to ensure mounting members 200, 804 are at the same level;
26. Add LED panels 902 and cabling.

The system may provide:

Panels that align to each other through a floating frame and do not rely on a high level of accuracy when mounting the structure to a mounting structure or surface. This substantially simplifies the installation process, and/or Differences in thermal expansion between the mounting structure or surface and the screen are accommodated. In the X-axis this is facilitated through the mounting members being able to move in a limited fashion with respect to the Structural members that are attached to the mounting surface or structure. In the Y-axis the aluminium can expand or shrink in the slot independently of the mounting structure or surface.

In further embodiments different structural member profiles can be made to different strengths. In an example embodiment one profile may have sufficient strength for wind loading with a 3 m span between mounting points, however a larger stronger profile could be used for a 6 m span. Where a wall is used to mount the system, a lighter structural member could be used with more fixing points. The system is sufficiently flexible to support this.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A modular display system comprising:

a structural member configured to be mounted to a fixture, the structural member configured to be mounted substantially vertically, the structural member comprising a receiving recess, the recess extending parallel with, and for a substantial portion of, a longitudinal axis of the structural member;

a plurality of display panels; and a mounting member configured to mount, support and/or align the plurality of display panels, the mounting member configured to be substantially retained by the structural member in at least one axis of movement, but to allow restricted translation in at least one translation axis and/or restricted rotation in at least one rotational axis, the mounting member comprising an interface flange to mate with the receiving recess, the interface flange extending parallel with, and for a substantial portion of, a longitudinal axis of the mounting member, and wherein the interface flange of the mounting member and the receiving recess of the structural member are configured to allow sufficient movement in an X axis to allow for alignment of the plurality of display panels within a predetermined tolerance limitation and to allow for different co-efficient of thermal expansion between the plurality of display panels and the structural member during a predetermined thermal cycle, horizontal spacers of approximately same width as each display panel. provided at least at the top and bottom to nominally position two or more structural members at the substantially the same spacing as the display panels wherein the spacers are screwed into in other consecutively, or a further comprising a header and a footer with slots to engage with each of the structural members.

2. The modular display system of claim 1 further comprising a packer or adjustment plate configured to adjust a Z direction of each structural member.

3. The modular display system of claim 1 further comprising an adjustable base/end stop for adjustment of the mounting member in a Y-axis.

4. The modular display system of claim 3 further comprising an additional fixing configured as a backup support for end stop failure.

5. The modular display system of claim 1 further comprising Teflon® or low resistance bushes configured to reduce the interface flange binding to the receiving recess.

6. The modular display system of claim 1 wherein the interface flange is configured to slide into the receiving recess.

7. The modular display system of claim 6 wherein an X axis movement is limited by a width of a slot in the receiving recess.

8. The modular display system of claim 1 further comprising a rubber coating on the mounting member or silicon injected configured to avoid the mounting member vibrating in or moving with wind.

9. The modular display system of claim 1 further comprising a plurality of alignment holes in the mounting member configured to receive matching spigots on the display panels and a sliding lock to clamp the display panels to the mounting member.

10. The modular display system of claim 1 wherein the modular display system is configured to allow for thermal expansion during the day of a building to which the structural member is mounted to.

11. The modular display system of claim 10 where the thermal expansion is due to a temperature variation of 800C over a period of 12 hours.

12. The modular display system of claim 1 wherein the mounting member is configured to have sufficient geometric freedom to move to allow the plurality of display panels to align to each other, while mechanically coupling the same mounting member into the structural member.

13. The modular display system of claim 1 wherein a connection mechanism from the plurality of display panels to the mounting member is configured to ensure that the surface of each display panel is substantially co-planar to a mounting surface of the mounting member for the modular display system to be substantially co-planar.

14. The modular display system of claim 1 wherein the interface flange and the receiving recess are configured to restrict movement in an Z axis, Y axis and/or a rotational axis substantially about the longitudinal axis of the interface flange, to maintain a predetermined coplanarity of the plurality of display panels.

15. The modular display system of claim 1 further comprising an attachment flange; wherein the interface flange has bulbed edges to avoid binding and wherein the attachment flange includes a plurality of attachment apertures for each of the plurality of display panels.

16. The modular display system of claim 15 wherein the mounting member is configured to have sufficient geometric freedom to move to allow the plurality of display panels to align to each other, while mechanically coupling the same mounting member into a structural member.

17. The modular display system of claim 15 wherein a connection mechanism from the plurality of display panels to the mounting member is configured to ensure that the surface of each display panel is substantially co-planar to a mounting surface of the mounting member for the modular display system to be substantially co-planar.

18. The modular display system of claim 15 wherein the interface flange and the receiving recess are configured to restrict movement in an Z axis, Y axis and/or a rotational axis substantially about the longitudinal axis of the interface flange, to maintain a predetermined coplanarity of the plurality of display panels.

19. The modular display system of claim 15 further comprising a packer or adjustment plate configured to adjust a Z direction of each structural member.

20. The modular display system of claim 15 further comprising an adjustable base/end stop for adjustment of the mounting member in a Y-axis.

21. The modular display system of claim 20 further comprising an additional fixing configured as a backup support for end stop failure.

22. The modular display system of claim 15 further comprising horizontal spacers of approximately same width as each display panel, provided at least at the top and bottom to nominally position two or more structural members at the substantially the same spacing as the display panels.

23. The modular display system of claim 22 wherein the spacers are screwed into in other consecutively, or a further comprising a header and a footer with slots to engage with each of the structural members.

24. The modular display system of claim 15 further comprising Teflon® or low resistance bushes configured to reduce the interface flange binding to the receiving recess.

25. The modular display system of claim 15 wherein the interface flange is configured to slide into the receiving recess.

26. The modular display system of claim 25 wherein an X axis movement is limited by a width of a slot in the receiving recess.

27. The modular display system of claim 15 further comprising a rubber coating on the mounting member or silicon injected configured to avoid the mounting member vibrating in or moving with wind.

28. A modular display system comprising:

a structural member configured to be mounted to a fixture, the structural member configured to be mounted substantially vertically, the structural member comprising a receiving recess, the recess extending parallel with, and for a substantial portion of, a longitudinal axis of the structural member;

a plurality of display panels; and a mounting member configured to mount, support and/or align the plurality of display panels, the mounting member configured to be substantially retained by the structural member in at least one axis of movement, but to allow restricted translation in at least one translation axis and/or restricted rotation in at least one rotational axis, the mounting member comprising an interface flange to mate with the receiving recess, the interface flange extending parallel with, and for a substantial portion of, a longitudinal axis of the mounting member, and wherein the interface flange of the mounting member and the receiving recess of the structural member are configured to allow sufficient movement in an X axis to allow for alignment of the plurality of display panels within a predetermined tolerance limitation and to allow for different co-efficient of thermal expansion between the plurality of display panels and the structural member during a predetermined thermal cycle, further comprising a plurality of alignment holes in the mounting member configured to receive matching spigots on the display panels and a sliding lock to clamp the display panels to the mounting member.

29. A modular display system comprising:

a structural member configured to be mounted to a fixture, the structural member configured to be mounted substantially vertically, the structural member comprising a receiving recess, the recess extending parallel with, and for a substantial portion of, a longitudinal axis of the structural member;

a plurality of display panels; and a mounting member configured to mount, support and/or align the plurality of display panels, the mounting member configured to be substantially retained by the structural member in at least one axis of movement, but to allow restricted translation in at least one translation axis and/or restricted rotation in at least one rotational axis, the mounting member comprising an interface flange to mate with the receiving recess, the interface flange extending parallel with, and for a substantial portion of, a longitudinal axis of the mounting member, and wherein the interface flange of the mounting member and the receiving recess of the structural member are configured to allow sufficient movement in an X axis to allow for alignment of the plurality of display panels within a predetermined tolerance limitation and to allow for different co-efficient of thermal expansion between the plurality of display panels and the structural member during a predetermined thermal cycle, wherein the modular display system is configured to allow for thermal expansion during the day of a building to which the structural member is mounted.

30. A modular display system comprising:

a structural member configured to be mounted to a fixture, the structural member configured to be mounted substantially vertically, the structural member comprising a receiving recess, the recess extending parallel with, and for a substantial portion of, a longitudinal axis of the structural member;

a plurality of display panels; and a mounting member configured to mount, support and/or align the plurality of display panels, the mounting member configured to be substantially retained by the structural member in at least one axis of movement, but to allow restricted translation in at least one translation axis and/or restricted rotation in at least one rotational axis, the mounting member comprising an interface flange to mate with the receiving recess, the interface flange extending parallel with, and for a substantial portion of, a longitudinal axis of the mounting member, and wherein the interface flange of the mounting member and the receiving recess of the structural member are configured to allow sufficient movement in an X axis to allow for alignment of the plurality of display panels within a predetermined tolerance limitation and to allow for different co-efficient of thermal expansion between the plurality of display panels and the structural member during a predetermined thermal cycle, further comprising an attachment flange; wherein the interface flange has bulbed edges to avoid binding and wherein the attachment flange includes a plurality of attachment apertures for each of the plurality of display panels, further comprising Teflon® or low resistance bushes configured to reduce the interface flange binding to the receiving recess.

* * * * *